United States Patent

Schuster et al.

[11] B  3,925,513

[45] Dec. 9, 1975

[54] MOULDING COMPOSITIONS

[75] Inventors: Herbert Schuster, Koeln-Stammheim, Germany; Edmund Huther, Rio de Janeiro, Brazil; Karl-Heinz Ott, Leverkusen; Karl Dinges, Odenthal, both of Germany

[73] Assignee: Bayer Aktiengesellschaft, Germany

[22] Filed: May 25, 1972

[21] Appl. No.: 256,936

[44] Published under the Trial Voluntary Protest Program on January 28, 1975 as document no. B 256,936.

[30] Foreign Application Priority Data

May 26, 1971 Germany............................ 2126151

[52] U.S. Cl............. 260/883; 260/876 R; 260/885; 260/886

[51] Int. Cl.².................... C08L 33/00; C08L 39/00

[58] Field of Search............ 260/881, 886, 885, 883

[56] References Cited
UNITED STATES PATENTS 3,468,976  9/1969  Yanai et al. ........................ 260/881

FOREIGN PATENTS OR APPLICATIONS 1,062,286  3/1967  United Kingdom................. 260/881

*Primary Examiner*—Murray Tillman
*Assistant Examiner*—J. Ziegler
*Attorney, Agent, or Firm*—Connolly and Hutz

[57] ABSTRACT

Thermoplastic moulding compositions which comprise: 5 to 50 parts by weight, of an elastomeric copolymer of 94 to 99.5 parts by weight of an acrylic acid alkyl ester having 4 to 10 carbon atoms in the alkyl group and 0.5 to 6 parts by weight of an acrylamide- or methacrylamide-N-alkylol compound of the general formula (I)

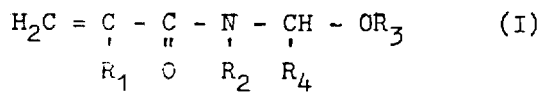

in which
$R_1$ represents H or $CH_3$;
$R_2$ represents H or an alkyl group having 1 to 8 carbon atoms;
$R_3$ represents H or an alkyl group or a carboxyalkyl group having 1 to 10 carbon atoms; and
$R_4$ represents H or $CH_3$, and 95 to 50 parts by weight, of a polymerised mixture of
i. styrene, nuclear or side chain alkyl styrene, methacrylic acid alkyl ($C_1 - C_4$) ester or mixtures thereof
ii. acrylonitrile, methacrylonitrile, an alkyl ($C_1 - C_4$) ester of methacrylic or fumaric acid, or mixtures thereof, in a weight ratio of (i) : (ii) = 100 : 0 to 60 : 40 at least 20% of the total polymerised mixture being graft-polymerised onto the elastomer in aqueous dispersion.

13 Claims, No Drawings

MOULDING COMPOSITIONS

This invention relates to high-impact moulding compositions based on elastic-thermoplastic graft copolymers containing a copolymer of an alkyl ester of acrylic acid and a (meth)acrylic acid amide-N-alkylol compound as the grafting base.

Graft copolymers of styrene on a diene homopolymer or copolymer as known as "high impact polystyrenes." So-called "ABS" polymers (for: acrylonitrile, butadiene, styrene) are also known in the art. These are moulding compositions obtained by graft copolymerising styrene and acrylonitrile onto a butadiene homopolymer or copolymer and optionally admixing separately prepared sytrene/acrylonitrile copolymer.

High impact polystyrene has fair impact strength and good flow properties. "ABS"-polymers by comparison are superior in their fastness to solvents, surface gloss, thermal stability, hardness, toughness and rigidity.

Unfortunately, high impact moulding compositions which contain diene hompolymers or copolymers are subject to ageing and lose their favourable mechanical properties after some time. A possible cause of ageing is cleavage of the C=C-double bonds of the diene polymer by atmospheric oxygen under the action of light and heat.

Accordingly, elastomeric polymers have been applied as grafting bases which contain no or only few C=C-double bonds in an attempt to inhibit ageing.

Onto, i.e. chlorinated polyethylene as the rubber base styrene and acrylonitrile have been grafted and separately prepared styreneacrylonitrile copolymers have been added. Expectedly these moulding compositions show little ageing, however, they are difficult to process in injection-moulding machines and extruders. In fact, only machines operating within a narrow temperature range can be used. Further, these moulding compositions have totally unsatisfactory toughness at about 0°C, i.e. in a temperature range of practical significance.

Ethylene-propylene copolymers and ethylene-propylene terpolymers have much lower second-order transition temperatures than chlorinated polyethylene. When they are used as grafting bases, the deterioration in toughness at low temperatures is less pronounced but still serious enough. Grafting onto ethylene-propylene copolymers and ethylene-propylene terpolymers, however, involves more elaborate methods of production than the conventional production of ABS polymers. Further, the high-impact moulding compositions produced from such rubbers do not show high resistance to ageing which was to be expected from low C=C-double bond content.

High-impact styrene- and styrene-acrylonitrile graft copolymers on a polypentenamer grafting base exhibit high resistance to ageing and outstanding toughness, even at low temperatures. Although these products meet requirements which were hitherto impossible to satisfy, their resistance to ageing is insufficient for very stringent demands of outdoors applications.

Acrylic acid ester copolymers can also be used in the production of high-impact plastics with improved resistance to ageing. However, the graft polymerisation of monomers or monomer combinations such as styrene or styrene and acrylonitrile onto copolymers of acrylic acid esters with diolefins such as butadiene or isoprene, gives products which are insufficiently resistant to ageing because of the C=C-double bonds present in them.

Attempts to avoid the presence of C=C-double bonds by mixing a hard and brittle polymer with a saturated polyacrylic acid ester which is elastomeric at room temperature, and to cross-link the components via built-in functional groups, yielded products of high stability to ageing, but unsatisfactory hardness, surface quality and gloss homogenity.

Processes are also known for graft polymerising sytrene or styrene-acrylonitrile mixtures onto copolymers free from double bonds of acrylic esters and monomers which facilitate grafing such as vinyl alkyl ethers or p-isopropyl-α-methyl styrene.

Ageing-resistant plastics obtained in this way show sufficient toughness only at relatively high elastomer content. Thus, although they may be made as tough as conventional ABS-plastics, they are not as hard. This low hardness is also reflected in undesirably high swelling of the material in aliphatic hydrocarbons and in irregular surface gloss of injection mouldings made therefrom.

A process for the production of high-impact moulding compositions has now been found in which 95 to 10 parts by weight, preferably 90 to 15 parts by weight of a mixture of i. styrene, nuclear or side chain alkyl styrene, methacrylic acid alkyl ($C_1 - C_4$) ester or mixtures thereof ii. acrylonitrile, methacrylonitrile, an alkyl ($C_1 - C_4$) ester of methacrylic or fumaric acid or mixtures thereof in a weight ratio of (i) : (ii) = 100 : 0 to 60 : 40 are graft polymerised at a temperature of from 60° to 70°C in an aqueous dispersion in the presence of 5 to 90 parts by weight and preferably 10 to 85 parts by weight of an elastomer (a), and the graft polymer (A) formed is optionally mixed with a copolymer (B) produced from monomers (i) and monomers (ii) at a weight ratio of (i) : (ii) = 100 : 0 to 60 : 40, in such proportions that the moulding composition contains from 5 to 50%, preferably from 10 to 40% of the elastomer (a), in which process the elastomer (a) is an emulsion polymer of 94 to 99.5 parts by weight of an acrylic acid alkyl ester having 4 to 10 carbon atoms in the alkyl group and 0.5 to 6 parts by weight of an acrylamide- or methacrylamide-N-alkylol compound of the general formula (I):

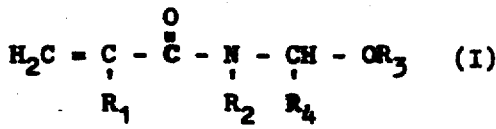

in which $R_1$ represents H or $CH_3$;

$R_2$ represents H or an alkyl group with 1 to 8 carbon atoms;

$R_3$ represents H, an alkyl group with 1 to 10 carbon atoms or a carboxyalkyl group with 1 to 10 carbon atoms; and $R_4$ represents H or $CH_3$, elastomer (a) having been produced at a temperature of below 70°C.

It is essential that the elastomer base should contain an acrylamide- or methacrylamide-N-alkylol compound of the general formula (I) and that the polymerisation temperatures mentioned above should be adhered to. It is particularly surprising that the presence of an acrylamide- or a methacrylamide alkylol compound considerably improves the graftability of the elastomer, and that the improved properties compared with conventional high-impact moulding compositions, are only obtained when the specified polymerisation temperatures are adopted.

The invention also relates to moulding compositions which comprise:

C. 5 to 50 parts by weight, preferably 10 to 40 parts by weight, of an elastomeric copolymer of 94 to 99.5 parts by weight of an acrylic acid alkyl ester having 4 to 10 carbon atoms in the alkyl group and 0.5 to 6 parts by weight of an acrylamide- or methacrylamide-N-alkylol compound of the general formula (I):

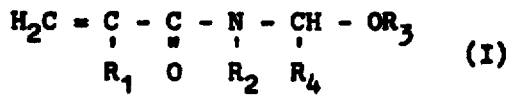

(I)

in which

R₁ represents H or CH₃;

R₂ represents H or an alkyl group having 1 to 8 carbon atoms;

R₃ represents H, an alkyl group with 1 to 10 carbon atoms or a carboxyalkyl group with 1 to 10 carbon atoms; and R₄ represents H or CH₃, and:

D. 95 to 50 parts by weight, preferably 90 to 60 parts by weight, of a polymerised mixture of
  i. styrene, nuclear or side chain alkyl styrene, methacrylic acid alkyl (C₁ – C₄) ester or mixtures thereof
  ii. acrylonitrile, methacrylonitrile, an alkyl (C₁ – C₄) ester of methacrylic or fumaric acid or mixtures thereof in a weight ratio of (i) : (ii) = 100 : 0 to 60 : 40 at least 20% of the total mixture (D) present having been graftpolymerised in aqueous dispersion in the presence of elastomer (C). The degree of grafting of the graft copolymer, defined as the weight ratio of grafted-on monomers to elastomeric copolymer, is from 0.05 to 3.

Mouldings produced from the compositions of the invention exhibit high toughness, uniform surface gloss, limited swelling in aliphatic hydrocarbons and excellent stability to ageing.

The elastomers (grafting bases) of the invention are prepared by copolymerising 94 to 99.5% of acrylic acid alkyl esters having 4 to 10 carbon atoms in the alkyl group and 0.5 to 6% by weight of acrylamide- or methacrylamide alkylol compounds of the general formula (I) in aqueous emulsion by methods known in the art.

Preferred acrylic acid alkyl esters are acrylic acid-n-butyl ester, acrylic acid-tert.-butyl ester, acrylic acid hexyl ester, acrylic acid octyl ester, acrylic acid cyclohexyl ester or acrylic acid-2-ethylhexyl ester.

Examples of acrylamide- and methacrylamide alkylol compounds of formula (I) include, in particular, acrylamide methylol methyl ether, acrylamide-N-methylol and methacrylamide methylol methyl ether, methacrylamide-N-methylol, methacrylamide-N-methylol butyl ether, methacrylamide-N-methylol acetate.

The polymerisation is preferably carried out in the presence of the usual emulsifiers in quantities of up to 5% by weight, based on the monomers, such as alkali salts of aliphatic long chain sulphonic acids, aryl sulphonic acids, carboxylic acids having 10 to 20 carbon atoms or reaction products of 5 to 20 mols of ethylene oxide with 1 mol of a fatty alcohol having 10 to 20 carbon atoms or with 1 mol of alkyl phenol. The polymerisation reaction can also be carried out in the absence of emulsifiers if the content of the acrylamide or methacrylamide alkylol compound does not exceed 3% by weight.

Peroxide compounds such as an alkali or ammonium persulphate, hydrogen peroxides, organic peroxides such as benzoyl peroxide or aliphatic azo compounds, which are able to initate the polymerisation reaction by decomosition into radicals, are used as polymerisation activators. It is also possible to use redox systems such as alkali persulphate/sodium pyrosulphate or sodium sulphite or sodium formaldehyde sulphoxylate. Another example of a suitable redox system is the cumene hydroperoxide-dextrose system. The aforementioned activators or activator systems are used in the usual quantities, i.e. in quantities of from 0.1 to 3% based on the total monomer mixture. The polymerisation temperature must not exceed 70°C and is preferably from 20° to 70°C.

Small quantities of cross-linking monomers such as ethylene dimethacrylate or divinyl benzene may additionally be copolymerised.

the monomers to be grafted, preferably styrene or styreneacrylonitrile mixtures, are polymerised in the presence of the elastomer latex prepared as described above, for example by a continuous feed process. Instead of styrene and acrylonitrile alkyl derivatives thereof may be used such as α-methyl styrene, methacrylonitrile (styrene can be alkylated either in the phenyl nucleus or in the side chain). It is also possible to employ the halogenated styrene and/or acrylonitrile, for example 2,5-dichlorostyrene, 2,4-dichlorostyrene or α-chloroacrylonitrile, in order to influence polymer properties. The graft polymerisation can also be carried out in the presence of a third monomer such as a methacrylic acid alkyl ester having 1 to 6 carbon atoms, for example, methylmethacrylate or an alkyl methacrylate. Alternatively these methacrylic acid esters can be the only graft monomers.

In one preferred polymerisation embodiment, 0.1 to 0.5 parts by weight, based on the total graft polymer, of peroxidic polymerisation initiators of the ammonium or alkali persulphate type, are added to the elastomer which is present in latex form and the latex then heated to between 60° and 70°C. 95 to 10 parts by weight, preferably 90 to 15 parts by weight, of the monomer or monomer mixture are then added over a period of from 30 minutes to 6 hours simultaneously with an emulsifier solution consisting of 0.1 to 2.0 parts by weight of an emulsifier as mentioned above and 25 parts by weight of water, to 5 to 90 parts by weight, preferably 10 to 85 parts by weight, and more particularly 40 to 85 parts by weight, of the elastomer. The quantity of emulsifier added is not particularly critical. The emulsifier can even be omitted altogether when the latex stability of the elastomer base is sufficiently high or when the ratio of elastomer to graft monomer is high.

It is essential that the graft polymerisation temperature is 60° to 70°C to obtain the desired properties of the moulding compositions. Polymerisation temperatures above 70°C result in low toughness, and below 60°C irregular surface gloss is observed.

In order to improve the processing properties of the end products, molecular weight regulators normally used for radical polymerisation reactions, such as dodecyl mercaptan, can be added during the graft polymerisation reaction in quantities of up to 0.5% based on the graft polymer.

The thermoplastic polymer to be mixed with the graft polymer can be prepared by similar methods and under similar conditions to those employed in the production of the graft polymer itself. The thermoplastic polymer can, however, also be prepared by other methods such as by block polymerisation, solution polymerisation, precipitation polymerisation or suspension polymerisation. The composition of the separately polymerised component can be the same as or different from that of the monomer mixture polymerised in the presence of the elastomer base.

The graft copolymer can be mixed with the separately polymerised thermoplastic polymer either by mixing the latices and joint precipitation or by mixing the solids on mixing rollers, single-screw or multiple-screw extruders or in internal mixers.

The properties required of the end product will determin the composition of the graft polymers and of the graft copolymers. An elastomer content of 10% is the lower limit at which the elasticising effect of the elastomer is still technically interesting. Toughness increases with increasing elastomer content whereas hardness decreases. An elastomer content of greater than 40%, gives products which are too soft too be used as plastics.

Irrespective of their elastomer content in the indicated ranges, the graft copolymers produced show a significantly higher toughness and significantly lower swelling in aliphatic hydrocarbons than conventional high-impact styrene or styrene/acrylonitrile grafts onto acrylic ester elastomers.

The polymers are isolated from the latices or latex mixtures by coagulation on addition of an electrolyte, such as sodium chloride, calcium chloride, magnesium or aluminium sulphate, or by low-temperature coagulation.

The solid product obtained after separation of liquids by filtration or centrifuging, washing and drying, is processed on mixing rollers, kneaders, internal mixers or similar machines at temperatures of from about 145° to 220°C, and made into a granulate. Stabilisers can be added to the latex before precipitation. Further stabilizers, dyes, pigments and lubricants may be added in the mixing rollers and mixing machines.

The granulate obtained after such compounding can be further processed in screw-type or ram-type injection moulding machines into any kind of injectioon mouldings, or alternatively can be further processed in a variety of different types of extruder into tubes, profiles or sheets, i.e. into semi-finished products.

The process according to the invention and the products obtained by this process are illustrated in the following Examples in which "parts" are "parts by weight" unless otherwise stated.

EXAMPLE 1

I. Production of the elastomer base

A solution of 1.0 part of sodium alkyl sulphonate ($C_{12} - C_{18}$) and 0.3 part of potassium persulphate in 200 parts of desalted water, is introduced into a glass reaction vessel equipped with a stirring mechanism, thermometer and dropping funnel, and heated to 63° – 65°C. A mixture of 96 parts of butyl acrylate and 4 parts of methacrylamide-N-methylol methyl ether is uniformly run in from the dropping funnel over a period of 4 hours. On completion of this addition, the stirred mixture is maintained at 63° –65°C for another 4 hours. A 33.3% latex of the acrylic ester copolymer is obtained. Gel contant: 85% in acetone.

II. Production of the graft polymer

A solution of 0.5 parts of potassium persulphate in 75 parts of desalted water is added to 150 parts of an elastomer latex prepared as described above followed by heating to 65°C. A solution of 0.5 parts of sodium alkyl sulphonate ($C_{12} - C_{18}$) in 25 parts of desalted water and a mixture of 36 parts of styrene and 14 parts of acrylonitrile are then run in with stirring over a period of 4 hours at this temperature. On completion of this addition, the mixture is maintained for another 4 hours at 65°C while being stirred. A 33.3% emulsion containing the graft polymer is obtained. A degree of grafting G defined as the ratio by weight of grafted styrene acrylonitrile copolymer to grafting base, of 0.56 was measured on a sample of this polymer.

III. Mixing, precipitation and compounding 7200 g of the 33.3% graft polymer latex obtained as described in II are mixed with 8,340 g of a 43.2% copolymer latex obtained by the emulsion polymerisation of styrene and acrylonitrile in a ratio of 72 : 28 (intrinsic viscosity 0.75 dl/g in dimethyl formamide at 20°C). The ratio of graft polymer to styrene-acrylonitrile copolymer thus amounts to 40 : 60. Following the addition of 30 g of an anti-ageing agent, such as 2, 6-di-tert.-butyl-p-cresol, the latex mixture is coagulated by addition of an equal volume of a 2% magnesium sulphate solution, the coagulate filtered off, washed and dried. The fine-grained powder is consolidated on mixing rollers at 170°C into a rough sheet which is subsequently granulated. Standard small bars are injected from the granulate and their physical data is set out in Table I, column 1.

Comparison Example A

A polymer is prepared in the same way as described in Example 1, except that the elastomer base was produced from 100 parts of butyl acrylate, i.e. in the absence of methacrylamide-N-methylol methyl ether. In other respects, the procedure was as described in Example 1. The properties of this mixture are set out in Table 1, column A.

Comparison Example B

A polymer mixture is prepared in the same way as described in Example 1, except that the graft polymerisation stage is omitted. The mixture is thus prepared from 1,200 g of elastomer latex produced as described in I and 3,700 g of the 43.2% styrene-acrylonitrile copolymer latex which has an intrinsic viscosity of 0.75 dl/g in dimethyl formamide at 20°C. The product is worked up in the same way as described in Example 1. The properties of this mixture are set out in Table 1, column B.

Comparison Example C

In this example, a styrene-acrylonitrile graft copolymer is produced from an acrylic ester copolymer in accordance with the prior art.

24 parts of vinyl ether, 64 parts of butyl acrylate, 11 parts of acrylonitrile and 1 part of butane diol diacrylate are polymerised with stirring at 65°C in 200 parts of desalted water to which 1 part of sodium alkyl sulphonate ($C_{12} - C_{18}$) and 0.3 parts of potassium persulphate have been added. In other words, all the vinyl ether and 20% of the remaining monomers are initially introduced with the water, emulsifier, and catalyst. After the reaction has started, the rest of the monomer mixture is uniformly introduced over a period of 4 hours and the mixture is then stirred for a further 4 hours at 65°C.

300 parts of the latex thus prepared are mixed with 35 parts of a mixture of styrene and acrylonitrile in a ratio of 72 : 28 and 70 parts of water. This mixture is then polymerised with stirring at a temperature of 80°C. 0.5 parts of potassium persulphate are again added as polymerisation initiator.

810 g of the graft latex are mixed with 1,850 g of the 43.2% styrene-acrylonitrile copolymer latex used in the preceding Examples and the mixture worked up as described in Example 1.

The physical data measured on standard small bars produced from this mixture are set out in Table 1, column C.

Comparison example D

The object of this Example is also to demonstrate the properties of styrene-acrylonitrile graft copolymers based on acrylic ester copolymers of the kind which can be obtained according to the prior art.

A solution of 62.5 parts of sodium alkyl sulphonate ($C_{12} - C_{18}$), 3.75 parts of sodium metabisulphite and 2.5 parts of potassium persulphate in 5,000 parts of desalted water is introduced into a reaction vessel. 2,312.5 parts of butyl acrylate and 187.5 parts of p-isopropyl-α-methyl styrene are then emulsified in this solution. After the air in the reaction vessel has been replaced by nitrogen, a polymerisation reaction is carried out over a period of 20 hours at 40° to 45°C.

1,136 parts of the 33.9% latex thus prepared are mixed with 3,000 parts of desalted water. 1,180 parts of styrene and 420 parts of acrylonitrile are emulsified in the resulting mixture. After heating to 30°C, 2 parts of potassium persulphate dissolved in 40 parts of water are added. The temperature of the emulsion is then increased to 50° – 55°C over a period of 1 hour. The polymerisation reaction is complete after 16 hours.

The polymer emulsion is stabilised with 9 g of 2,6-ditert.-butyl-p-cresol and worked up as described in Example 1.

The physical properties of standard small test bars produced from this polymer are set out in Table 1 under column D.

EXAMPLE 2

A graft copolymer is prepared as described in Example 1, except that an elastomer base consisting of 97 parts of butyl acrylate and 3 parts of methacrylamide-N-methylol methyl ether is used.

The notched impact strength of standard small test bars injection-moulded from this product was found by measurement to be 15.6 kg cm/cm².

Comparison Example E

An ABS polymer consisting of 40 parts of a graft polymer, which comprises 50 parts of emulsion polybutadiene, 36 parts of styrene and 14 parts of acrylonitrile and of 60 parts of a styrene-acrylonitrile copolymer (intrinsic 0.75 dl/g in dimethyl formamide at 20°C), was produced by a conventional emulsion polymerisation technique.

Standard small test bars injection-moulded from this product had a notched impact strength of 18.0 kg cm/cm² at 20°C.

The products of Example 2 and of Comparison Example E were subjected to artificial ageing (xenon test according to Draft DIN 53389). The results are set out in table 2.

Table 2

| Example | E | 2 |
|---|---|---|
| Exposure time in hours | Impact strength at 20°C in kp cm/cm² DIN 53453 | Impact strength at 20°C in kp cm/cm² DIN 53453 |
| 0 | n.b. | n.b. |
| 50 | 75 | n.b. |
| 100 | 52 | n.b. |
| 150 | 23 | n.b. |
| 200 | 12 | n.b. |
| 300 | 10 | n.b. |
| 500 | 8 | n.b. | n.b. = unbroken

Table 2 demonstrates the distinct superiority of the moulding compositions according to the invention to ABS polymers based on diene rubbers in respect of resistance to ageing.

EXAMPLES 3 to 8

Table 1

| Example | 1 | A | B | C | D |
|---|---|---|---|---|---|
| Acrylic ester polymer content in % | 20 | 20 | 20 | 20 | 20 |
| Notched impact strength kp cm/cm² 20° DIN 53453 | 21 | 4.5 | 4.5 | 9.3 | 11.0 |
| Impact strength kp cm/cm² 20° DIN 53 453 | n.b.[1] | 30 | 26 | n.b.[1] | 80 |
| Ball indentation hardness kp/cm² 60" DIN 53456 | 790 | 750 | 755 | 760 | 500 |
| Swelling in petrol (%) | 0.8 | 5.2 | 4.8 | 3.5 | 4.2 |
| Surface gloss of injection-moulded panels as measured at 45°C with a Gardener glossmeter in accordance with ASTM D 2457-65 T | 52 | 20 (irregular) | 20 (irregular) | 45 | 40 |

[1]n.b. = unbroken (this abbreviation also applies to the following Tables

As can be seen from Table 1, the moulding composition according to the invention shows distinctly better impact strength behaviour and hence a more favourable relation between impact strength and hardness. This is crucially important for practical purposes. The greater resistance to aliphatic hydrocarbons and the improved surface gloss are also clearly recognisable.

Graft polymers of styrene-acrylonitrile on different acrylic ester copolymers are produced in accordance with Examples 1/I and 1/II. The data set out in Table 3 clearly show the dependence of the grafting of the styrene-acrylonitrile monomer mixture onto the elastomer base upon the methacrylamide-N-methylol methyl ether content of the graft base.

The degree of grafting G, defined as the ratio by weight of styrene-acrylonitrile copolymer grafted on, i.e. chemically bonded to the elastomer base, to the elastomer base was determined by extraction of the separately polymerised, i.e. ungrafted, styrene-acrylonitrile copolymer with acetone. This method of determining the degree of grafting is confirmed by analysis of the residual insoluble graft polymer by means of infra-red or by pyrolysis gas chromatography.

Table 3

| % of methacrylamide-N-methylol methyl ether in butyl acrylate copolymer | Degree of grafting G |
|---|---|
| 0 | 0.0 |
| 1 | 0.18 |
| 2 | 0.30 |
| 3 | 0.49 |
| 4 | 0.56 |
| 5 | 0.77 |

EXAMPLES 9 to 12

A number of graft copolymers was prepared according to the procedure described in Example 1, except that different polymerisation temperatures were applied during both the preparation of the elastomer latex and the preparation of the graft polymer latex.

The physical data obtained from injection-moulded standard small test bars and injection mouldings produced from each graft copolymer, are set out in Table 4. All the graft copolymers contain 20% of elastomer grafting base, synthesised from 97 parts of butyl acrylate and 3.0 parts of methacrylamide-N-methylol methyl ether.

Table 4

| Polymerisation temperature during preparation of the elastomer base | Polymerisation temperature during preparation of the graft polymer | 1 $a_k$ 20°C | 2 $a_n$ 20°C | 3 0 | Degree of grafting G |
|---|---|---|---|---|---|
| 65°C | 65°C | 16 | n.b. | glossy | 0.46 |
| 80°C | 65°C | 4 | 50 | glossy | 0.24 |
| 65°C | 80°C | 8 | 70 | glossy | 0.34 |
| 50°C | 50°C | 15 | n.b. | dull non-uniform | 0.45 |

1) $a_k$ = notched impact strength in kp cm/cm² according to DIN 53453
2) $a_n$ = impact strength in kp cm/cm² according to DIN 53453
3) 0 = surface gloss, visually assessed The influence of the polymerisation temperature during preparation of the elastomer and of the graft polymer on the toughness of the polymers and on the surface texture of injection mouldings produced from them, is readily apparent from Table 4.

EXAMPLE 13

In this case, the elastomer base is prepared from 99 parts of butyl acrylate and 1 part of methacrylamide-N-methylol methyl ether in the absence of an emulsifier.

To prepare the graft polymer, a solution of 2.0 parts of the sodium salt of an alkyl sulphonic acid ($C_{12} - C_{18}$) in 25 parts of desalted water and a mixture of 36 parts of styrene and 14 parts of acrylonitrile, are uniformly run into 150 parts of the elastomer latex over a period of 4 hours at 65°C, a solution of 0.5 parts of potassium persulphate in 75 parts of desalted water having previously been added to the elastomer latex. On completion of the addition, the mixture is maintained, for a further 4 hours at 65°C.

The graft latex is mixed with a latex of styrene-acrylonitrile copolymer so that, after coagulation and drying, a graft copolymer containing 15% of elastomer is obtained.

Standard small test bars injection-moulded from this product had a notched impact strength of 12 kp cm/cm² at 20°C.

EXAMPLE 14

The procedure of Example 1 was repeated except that the ratio of graft base to graft monomer during preparation of the graft polymer was 80 : 20 and no emulsifier was added during the graft polymerisation reaction.

After mixing with a styrene-acrylonitrile copolymer of intrinsic viscosity 0.75 dl/g in dimethyl formamide at 20°C, a graft copolymer with an elastomer content of 20% was obtained. This was injection moulded into standard small test bars which showed the following physical data:

| | |
|---|---|
| Notched impact strength: | 18 kp cm/cm² (at 20°C) |
| Impact strength: | unbroken (at 20°C) |
| Ball indentation hardness 60": | 750 kp/Cm² |
| Swelling in petrol: | 1.2% |

EXAMPLE 15

A graft copolymer was prepared in the manner as described in Example 1, except that only methyl methacrylate was used as a grafting monomer and the graft polymer was mixed with a standard polymethyl methacrylate. A moulding composition with an acrylate elastomer content of 20% was obtained.

This product had a notched impact strength of 14 kp cm/cm² at 20°C.

EXAMPLE 16

An impact-resistant polystyrene was produced according to Example 15 by replacing the methyl-methacrylate with styrene and the polymethyl methacrylate with polystyrene.

Standard small test bars produced from this product had a notched impact strength of 16 kp cm/cm² at 200°C.

We claim:
1. A process for the production of high impact and ageing-resistant molding composition, which process comprises polymerizing (A) total of 95 parts by weight of a monomer mixture consisting of
   i. styrene, nuclear or side chain alkyl styrene or a mixture thereof and ii. acrylonitrile, methacrylonitrile or a mixture thereof in a weight ratio of (i) : (ii) of 100:0 to 60:40 in an aqueous dispersion at a temperature of from 60° to 70°C. in the presence of 5 to 90 parts by weight of (B) an elastomer, which elastomer is an emulsion polymer prepared at a temperature of below 70°C. and comprising in polymerized form from 94 to 99.5 parts by weight of an alkyl ester of acrylic acid having from 4 to 10 carbon atoms in the alkyl group and 6 to 0.5 parts by weight of an acrylamide or methacrylamide-N-alkylol compound of the formula $$H_2C = \underset{R_1}{\underset{|}{C}} - \underset{O}{\underset{\|}{C}} - \underset{R_2}{\underset{|}{N}} - \underset{R_4}{\underset{|}{CH}} - OR_3$$

wherein
$R_1$ is hydrogen or methyl;
$R_2$ is hydrogen or alkyl having from 1 to 8 carbon atoms;
$R_3$ is hydrogen, alkyl having 1 to 10 carbon atoms or carboxyalkyl having from 1 to 10 carbon atoms and
$R_4$ is hydrogen or methyl.

2. The process as claimed in claim 1 wherein a polymer of (i) and (ii) is added in an amount to yield a molding composition containing from 5 to 50% of the elastomer (B).

3. The process as claimed in claim 2 in which the molding composition produced contains from 10 to 40% of the elastomer.

4. The process as claimed in claim 1 in which the compound of said formula is acrylamide-N-methylol methyl ether.

5. The process as claimed in claim 1 in which the compound of said formula is methacrylamide-N-methylol methyl ether.

6. The process as claimed in claim 1 in which the compound of said formula is methacrylamide-N-methylol butyl ether.

7. The process as claimed in claim 1 in which the compound of said formula is methacrylamide-N-methylol acetate.

8. The process as claimed in claim 1 in which the compound of said formula is methacrylamide-N-methylol.

9. The process as claimed in claim 1 in which the compound of said formula is acrylamide-N-methylol.

10. The process as claimed in claim 1 in which (i) is styrene and (ii) is acrylonitrile.

11. A molding composition which comprises from 5 to 50 parts by weight of an elastomer, which elastomer comprises in polymerized form from 94 to 99.5 parts by weight of an alkyl ester of acrylic acid having from 4 to 10 carbon atoms in the alkyl group and from 6 to 0.5 parts by weight of an acrylamide or methacrylamide-N-alkylol compound of the formula:

$$H_2C = \underset{R_1}{\underset{|}{C}} - \underset{O}{\underset{\|}{C}} - \underset{R_2}{\underset{|}{N}} - \underset{R_4}{\underset{|}{CH}} - OR_3$$

wherein
$R_1$ is hydrogen or methyl;
$R_2$ is hydrogen or alkyl having from 1 to 8 carbon atoms;
$R_3$ is hydrogen, alkyl having 1 to 10 carbon atoms or carboxyalkyl having from 1 to 10 carbon atoms and
$R_4$ is hydrogen or methyl
and 95 to 50 parts by weight of a polymerized mixture consisting of
i. styrene, nuclear or side chain alkyl styrene or a mixture thereof and
ii. acrylonitrile, methacrylonitrile or a mixture thereof in a weight ratio of (i) : (ii) of 100:0 to 60:40,
at least 20% of said polymerized mixture having been graft polymerized in the presence of the elastomer in an aqueous dispersion.

12. The molding composition as claimed in claim 11 which contains from 10 to 40 parts by weight of the elastomer and from 90 to 60 parts by weight of the polymerized mixture.

13. The molding composition as claimed in claim 11 wherein (i) is styrene and (ii) is acrylonitrile.

* * * * *